Aug. 17, 1965     T. C. CLARK     3,200,527
HINGED SNAP-LOCK CONTAINER
Filed July 17, 1961     3 Sheets-Sheet 1
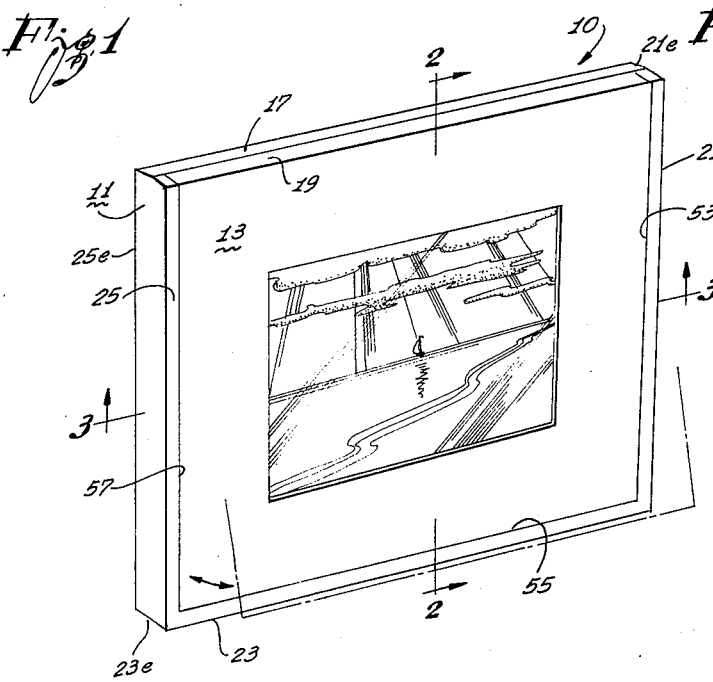
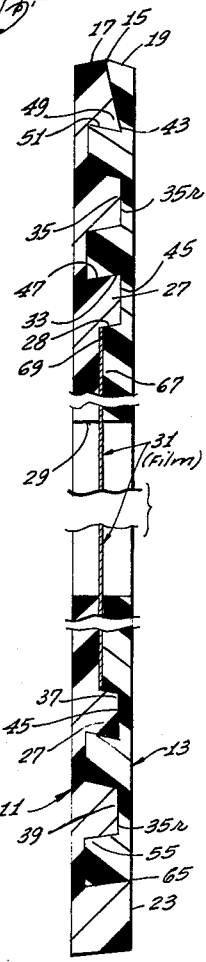
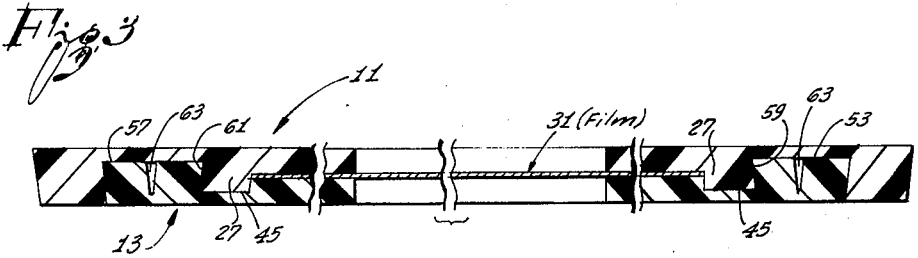
INVENTOR:
Thomas C. Clark
Attorneys

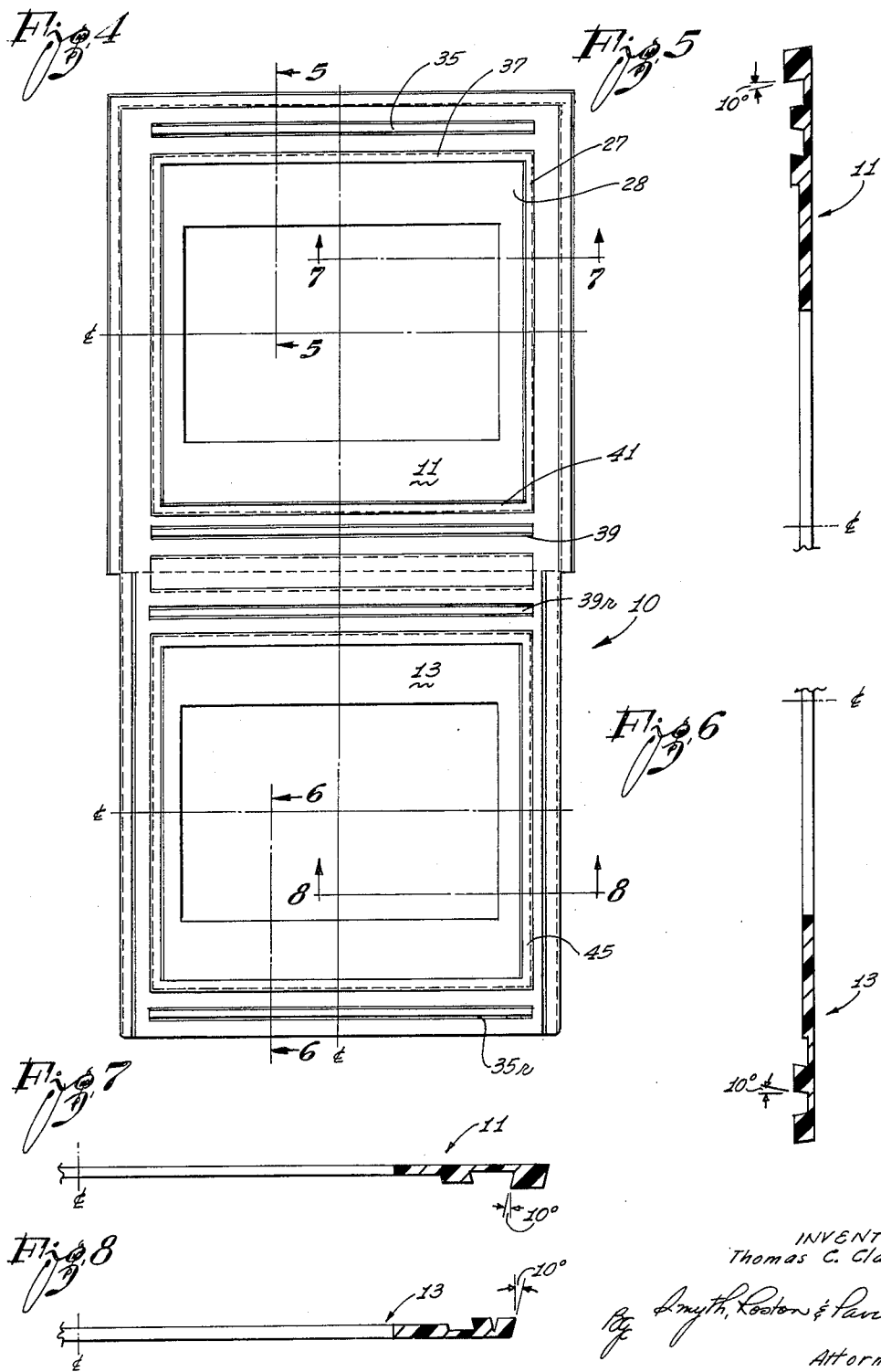

Aug. 17, 1965 T. C. CLARK 3,200,527
HINGED SNAP-LOCK CONTAINER
Filed July 17, 1961 3 Sheets-Sheet 3
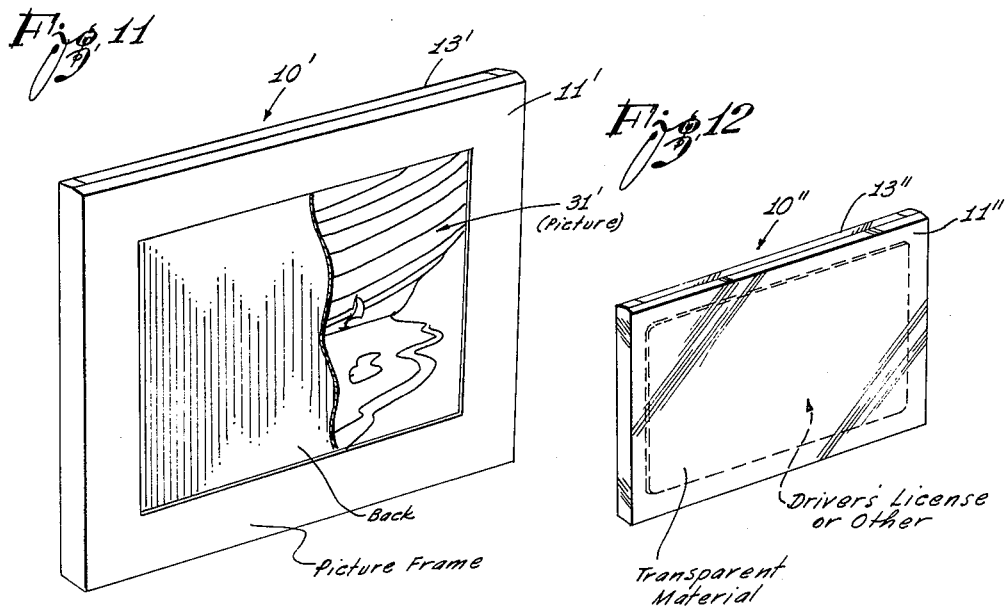
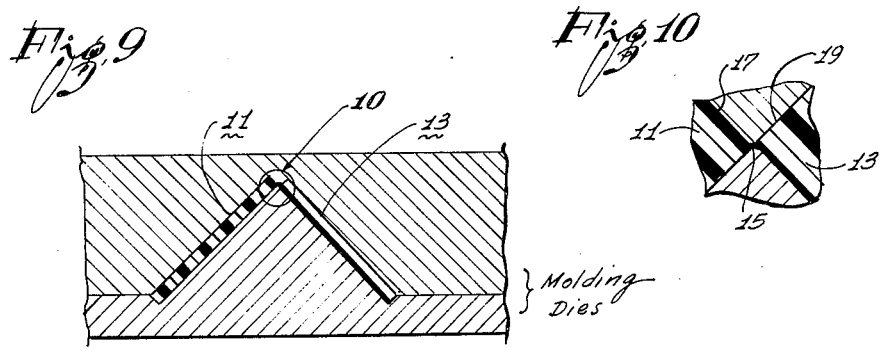
INVENTOR:
Thomas C. Clark
Attorneys United States Patent Office 3,200,527
Patented Aug. 17, 1965

3,200,527
HINGED SNAP-LOCK CONTAINER
Thomas C. Clark, Los Angeles, Calif., assignor to Mingwah A. Quon, Los Angeles, Calif.
Filed July 17, 1961, Ser. No. 124,655
6 Claims. (Cl. 40—152)

This invention relates to plastic containers in general, and particularly to plastic devices adapted to hold, for exposure or viewing, film transparencies, photographs or paintings.

From as far back in time as the days when photographic films were placed on glass and shown by means of "magic lanterns," "stereoscopes," or other early types of projectors, efforts have been made to provide suitable devices for properly holding the various types of film transparencies which have been employed. With the greatly increasing popularity of the 35 mm. camera, and of "still" projectors by which the developed negatives may be projected for viewing, an extensive market has been created for holders for the millions of these photographic negatives which are daily being developed for amateur and professional photographers.

Within the past fifteen years, as evidenced by numerous patents issued within this period, dozens of different types of film holders have been designed and offered to the public. As a consequence of these developments, the film transparency holding field has become extremely competitive.

A prime requisite of any such film transparency holder today, therefore, is that it may be made and sold at very low cost.

However, cost is not the only consideration. With the frequent re-showing of film transparencies in projectors, both in homes, businesses, schools and at public or pseudo-public affairs, the film holders are invariably subject to considerable wear and tear. They must, therefore, be quite sturdy. Cardboard film holders generally are not suited to receiving much abuse in handling. Unless specially treated or otherwise protected, the edges of cardboard film holders tend to bend or break. Such bending or breakage of the corners of cardboard film holders renders them unsuited to further re-use, particularly in automatic projecting machines, so that they will frequently be found to require replacement.

In recent years, considerable attention has been given to the use of film holders made of various plastic materials. However, those made of very rigid styrene are either expensive to manufacture or have presented other serious problems in manufacture and use, and film holders molded of polyethylene, because of their great flexibility, have been found to be unsuited for certain assembly operations in which they are assembled with film transparencies, and also have presented certain problems. Holders made of certain of these plastics also tend to soften and lose their shape under the heat generated by the lamps of certain types of projectors, or where the blowers of some projectors may become inoperative. It is thus desirable that if any film holder is to be molded of a thermoplastic material, such material be capable of withstanding substantial amounts of heat without softening and losing shape; further, that such material be a poor conductor of heat so as to protect the film transparency edges which are gripped by the film holder, from damage.

It is also a desirable feature of a film transparency holder that it be capable of being re-used by the ultimate customer. For example, when the owner of mounted film transparencies desired to replace a particular item of his collection, he may wish to remove such transparency from its mounting and reinsert the replacement transparency in the same mounting. Many film transparency holders heretofore devised have not been capable of such re-use. While some holders heretofore devised have been capable of re-use, those have either been too expensive to manufacture, been too insecure suitably to retain the transparency, been too flexible, or presented some other undesirable feature.

The present invention, as embodied in a film transparency holder, includes all of the foregoing desirable features of such a holder, while avoiding all the disadvantages found in one or more of various film holders heretofore made, sold, patented or otherwise constituting prior art film transparency holders.

A film transparency holder constructed in accordance with the present invention, comprises a rectangular framelike top member and a similar bottom member integrally molded of polypropylene, and joined in a thin line along one pair of mating edges of these two members. By such juncture and the fact that polypropylene has a high degree of flexibility when thinly dimensioned, and considerable resistance to fracture upon bending, the two members will be found to be effectively hinged to each other along such line of juncture, and may be swung apart from each other about the hinge axis. One of the two members is recessed to receive the other member when the latter is folded about the hinge axis and superimposed upon the former. In addition, in the preferred embodiment, the recessed member is further provided with a rectangular ridge extending in a rectangle inset from the inner edge of the frame, which ridge defines the perimeter of the area for receiving the film transparency. The other member is molded in such a configuration that when one member is superimposed upon the other member, a space sufficient to receive the film transparency is left between the two members and within the area defined by said ridge. The two members are removably secured together by means of at least one rectangular overhung projection in one member, which projection is of larger rectangular dimensions than those of the ridge, and an undercut recessing in the other member adapted to receive said projection. When the superimposed members are pressed together, the projection and recessing engage each other removably to interlock the members.

The present invention may be more fully understood by reference to the accompanying drawings in which:

FIGURE 1 is a perspective view of a film transparency holder constructed in accordance with the present invention, in which a film transparency is inserted;

FIGURE 2 is a section taken on the line 2—2 of FIGURE 1;

FIGURE 3 is a section taken on the line 3—3 of FIGURE 1;

FIGURE 4 is a plan view of the film transparency holder of FIGURE 1 showing the two members in opened position with the film transparency removed;

FIGURE 5 is a section taken on the line 5—5 of FIGURE 4;

FIGURE 6 is a section taken on the line 6—6 of FIGURE 4;

FIGURE 7 is a section taken on the line 7—7 of FIGURE 4;

FIGURE 8 is a section taken on the line 8—8 of FIGURE 4;

FIGURE 9 is a partial sectional view of a mold showing the manner in which the holder of FIGURE 10 is molded;

FIGURE 10 is an enlarged partial section showing the juncture between the edges of the two members molded integrally as shown in FIGURE 9;

FIGURE 11 is a perspective view of a picture frame constructed in accordance with the present invention; and FIGURE 12 is a perspective view of a flat container similarly constructed in accordance with the present invention.

Referring to FIGURE 1, the preferred embodiment of the present invention is in the form of a film transparency holder 10, which is comprised of a bottom member 11 and a top member 13. These two members are integrally molded in the manner shown in FIGURE 9. The integration of these two members, however, is limited to a line of juncture 15 (FIGURE 10) of the edges 17 and 19 of the two members 11 and 13 respectively.

The members 11 and 13 are preferably molded of a thermoplastic material such as polypropylene. This material, when molded, is not only flexible, but possesses great strength against fracture through bending or stressing. Therefore, when the members 11 and 13 are molded in the manner shown in FIGURES 9 and 10, with the thin line of juncture 15, it will be found that the members 11 and 13 may be moved relative to each other about an axis in the line of juncture 15. This line of juncture 15 preferably should be in the order of between .003" and .008" in thickness to permit such hinging action between the two members 11 and 13 with approximately 2" square over all dimensions and approximate thickness of .050" when the two members are brought together and interlocked in the manner hereinafter explained.

The bottom member 11 is preferably molded with three outer walls, 21, 23 and 25. One of these outer walls rises perpendicularly from each of three peripheral edges 21e, 23e and 25e, respectively, of the bottom member. The fourth edge 17 extends between the edges and walls 21, 21e and 25, 25e. The dimensions of the top member 13 are such as to permit this member to fit flushly within each of the outer walls 21, 23 and 25 of the bottom member 11 when the member 13 is superimposed upon the member 11.

As may be seen from FIGURES 2, 3 and 4, the bottom member 11 is formed with a rectangular ridge 27, which is inset from the inner edge 29 to define a rectangular area in which the film transparency 31 may be received. The latter outer wall 33 of the ridge 27 is preferably formed with about a 10° overhang.

The bottom member 11 is further preferably molded with a stiffening ridge 35, which extends parallel to the portion 37 of the rectangular ridge 27. A similar ridge 39 is provided on the opposite side of the rectangular ridge 27 to extend parallel to the portion 41 of that ridge. Each of the stiffening ridges 35 and 39 are trapezoidal in cross-section. These stiffening ridges 35 and 39 provide increased thicknesses of polypropylene to prevent bending of the member 11.

The edge 17 is raised in the manner best shown in FIGURE 2 to provide a similar 10° overhang 43. Each of the outer walls 21, 23 and 25 are also provided with a similar 10° overhang as best shown in FIGURES 2, 3, 5 and 7.

The top member 13 is molded in a manner to fit within the outer walls 21, 23 and 25 of the bottom member 11, and to provide a mating recess to receive the rectangular ridge 27, recesses 35r and 39r to receive the stiffening members 35 and 39 and a recess 49 to mate with the 10° overhang 43 of the edge 17 of the bottom member 11. Thereby the member 13, when pressed into engagement with the bottom member 11, interlocks with the latter. Those recesses in the top member which are provided to receive overhung projections of the bottom member are undercut to about 10° also to effect secure interlocking engagement. Thus, the recess 45 to receive the rectangular ridge 27 is undercut on its inner defining wall 47. Similarly, the recess 49, which is formed to receive the overhang 43 of the edge 17 of the bottom member 11 is undercut in its outer defining wall 51. Also, the edges 53, 55 and 57, which abut the inner undercut outer walls 21, 23 and 25 respectively, of the member 11, are overhung approximately 10°. Similarly overhung are the inner walls 59 and 61 of the edges 53 and 57 respectively of the member 13, as best shown in FIGURE 3.

It should be explained at this point that in the actual molding of the edges 53 and 57, a knifelike projection (not illustrated) is retractably included in the mold and withdrawn after the extrusion is completed and the product is set, thereby to leave a small slot 63 (FIGURE 3) whereby each of the two overhung walls of the edges 53 and 57 may be slightly compressed to permit ejection of the member 13 from the mold, in a manner well understood by those skilled in the plastic molding art.

By the above described system of overhung projections and undercut recesses incorporated in the two members 11 and 13, it will be readily apparent that when these two members are pressed together manually, or by means of rollers or other pressing device, the top member 13 will be interlocked with the bottom member 11 and received within the latter flushly within the overall .050" thickness of the bottom member 11.

However, due to the inherent limited resiliency of polypropylene of which the members 11 and 13 are preferably molded, as heretofore stated, the two members may be separated from each other by the insertion of a thin blade between the respective outer walls of the members 11 and 13 (as, for example, in plane 65, FIGURE 2), and prying these edges apart. Once separation has commenced, the other interlocking areas will be found to separate upon the application of a modest amount of oppositely directed forces.

The rectangular portion 67 of the bottom member 11 which fits within the film transparency receiving area 28, is molded in such a manner as to leave a thin space 69 between the bottom member 11 and the top member 13 within the area defined by the rectangular ridge 27. This space is preferably of the order of .003". Since the usual film transparency is of a thickness of .005", this spacing will result in placing the edges of film transparency 31, which are received in the space 69, under slight compression, thereby securing the transparency 31 against undesired movement within the framing film transparency holder.

In use, a film transparency is placed within the area 28 defined by the ridge 27 of the bottom member 11, and the top member 13 is then folded about the hinge axis formed by the line of juncture 15 between the edges 17 and 19. Pressure is then applied to the top member 13 while the bottom member 11 is held in a fixed position. The application of this pressure will force the mating ridges, projections and recesses of the two members 11 and 13 into complete interlocking engagement, thereby to cause the edges of the film transparency 31 to be secured between the recessed area 28 of the bottom member 11 and the projecting mating rectangular portion 67 of the member 13 within the rectangular ridge of the member 11.

It will thus be seen that the present invention provides a very sturdy and secure film transparency holder which is rigidly formed of a plastic material which has sufficient resiliency to enable the interlocking between the upper and lower mating members to be accomplished, but is not so resilient as to permit undesired bending of the device.

Since polypropylene is a poor conductor of heat, it will be found that the edges of the film transparency which are held between the top and bottom members are well insulated from any heat to which the holder may be placed in contact. Further, since polypropylene does not soften under the application of heat under 330° F., a film transparency holder made of this material will be found to be capable of withstanding almost any amount of heat which is generated in a film projector.

Since the two members 11 and 13 may be disengaged by means of a blade and separated from each other about the hinge axis in the line of juncture, such film transparency holders may be re-used whenever it is desired to replace a film transparency originally inserted in such a device.

While the embodiment of the present invention which has been described in detail with reference to FIGURES 1 through 10 inclusive of the drawings is in the form of a film transparency holder, it will be readily apparent to those persons skilled in the art that the principles of construction utilized in the thus described film transparency holder may readily be applied to the construction of other devices which are employed to hold various objects—particularly those which are flat. Thus, a picture frame for holding a photograph may readily be constructed in the manner illustrated generally in FIGURE 11. In such further embodiment of the invention, the bottom member 11 is molded without the central window provided in the bottom member 11 of the FIGURE 1 film transparency holder, but otherwise the picture frame may be constructed identically with the FIGURES 1 through 10 embodiment of the invention.

FIGURE 12 illustrates a still further embodiment of the invention in which neither the top nor the bottom member is provided with a window orifice. The result is a flat container in which the enclosed item may be completely protected from exposure to the atmosphere. If the plastic material of which this container is molded is transparent, so that the object inserted within the centrally recessed area is made visible without separating the top and bottom members, it will be appreciated that the present invention will provide an excellent means for preserving from damage through handling, any photograph or document such as a driver's license or an identification card. Howeyer, where it is necessary to remove the document from its holder, this may be accomplished by prying apart the top and bottom members in the same manner as described in the case of the film transparency holder.

Many other embodiments of the principles of this invention will occur to persons skilled in the art, but without departing from these principles. All of these other embodiments as well as those herein illustrated and/or described, are intended to be comprehended within the scope of this invention.

While the preferred embodiment of this invention contemplates the use of polypropylene, the invention is not to be regarded as limited to the use of this material, since other plastic materials heretofore or hereafter devised may afford most of the advantages of polypropylene and possibly even more advantages in a construction of the type described herein. So long as the plastic material includes sufficient resiliency to allow the interlocking elements to be engaged and disengaged in the manner heretofore explained, devices made of any such materials are also intended to be comprehended within the scope of this invention.

I claim:

1. A container, said container comprising a bottom member, and a top member covering at least a portion of the bottom member when said top member is superimposed upon the bottom member, each of said members, upon such superimposition, having a wall facing outwardly and oppositely from the outer wall of the other member, and an inner wall in partial facial abutment with the inner wall of the other member, the inner wall of one of said members having a rectangular ridge, the inner wall of the other one of said members having a mating rectangular recess thereby to define a cavity between them; the abutting faces of said inner walls being constructed with complementary interlocking elements, said interlocking elements comprising a pair of parallel overhung ridges projecting perpendicularly from the plane of the face of said other member and spaced from each other by a distance greater than the width of said cavity and thereby to be disposed one outward of each side of said cavity, each of said ridges extending for a distance substantially equal to the lineal dimension of said member, and a pair of matingly disposed undercut recesses in the face of said one member, respectively contiguous with overhung portions of two opposite ridge portions pertaining to said rectangular ridge, said members being molded of a resilient plastic, such as polypropylene, whereby said members may be separated from each other by the disengagement of said interlocking elements.

2. The container as described in claim 1, wherein the said interlocking elements include an additional overhung ridge extending between the said pair of ridges, and a further mating undercut recess to receive said additional ridge.

3. A container, said container comprising a bottom member, and a top member covering at least a portion of the bottom member when said top member is superimposed upon the bottom member, each of said members, upon such superimposition, having a wall facing outwardly and oppositely from the outer wall of the other member, and an inner wall in partial facial abutment with the inner wall of the other member, said inner walls being of a configuration to define a cavity between them; the abutting faces of said inner walls being constructed with complementary interlocking elements, said interlocking elements comprising a pair of parallel overhung ridges projecting perpendicularly from the plane of the face of one of said members and spaced apart from each other by a distance greater than the width of said cavity and thereby to be disposed one outward of each side of said cavity, each of said ridges extending for a distance substantially equal to the lineal dimension of said member, said ridges extending substantially from one edge toward an opposite edge of the last said one member, a third similarly projecting overhung ridge, said third ridge extending between the substantial terminals of said pair of ridges which terminals are remote from said one edge; said members being molded of a plastic, such as polypropylene, said members further being at least partially separable from each other by the disengagement of said interlocking elements.

4. A mounting device for a film transparency, said device comprising a rectangular holding frame having a central opening therein, and a retaining member, said retaining member having a similarly shaped central opening therein, whereby said openings register when said retaining member is superimposed upon the bottom member, each of said members, upon such superimposition, having a wall facing outwardly and oppositely from the outer wall of the other member, and an inner wall in partial facial abutment with the inner wall of the other member, the inner wall of one of said members having a rectangular ridge, the inner wall of the other one of said members having a mating rectangular recess thereby defining between them a recessed area surrounding said central opening and adapted to receive and retain the edges of the film transparency, the abutting faces of said inner walls being constructed with complementary interlocking elements, said interlocking elements comprising a pair of parallel overhung ridges projecting perpendicularly from the plane of the face of said other member and spaced from each other by a distance greater than the width of said opening and two opposite recessed areas, thereby to be disposed one outward of each of said opposite recessed areas, each of said ridges extending for a distance substantially equal to the lineal dimension of said member, and a pair of matingly disposed undercut recesses in the face of said one member, respectively contiguous with overhung portions of two opposite ridge portions pertaining to said rectangular ridge, said members being molded of a resilient plastic, such as polypropylene, whereby said members may be separated from each other by the disengagement of said interlocking elements.

5. The device as described in claim 4, wherein the said interlocking elements include an additional overhung ridge extending between the said pair of ridges, and a further mating undercut recess to receive said additional ridge.

6. A mounting device for a film transparency, said device comprising a rectangular holding frame having a central opening therein, and a retaining member, said retaining member having a similarly shaped central opening therein, whereby said openings register when said retaining member is superimposed upon the frame member, each of said members, upon such superimposition, having a wall facing outwardly and oppositely from the outer wall of the other member, and an inner wall in partial facial abutment with the inner wall of the other member, said inner walls defining between them a recessed area surrounding said central opening and adapted to receive and retain the edges of the film transparency, the abutting faces of said inner walls being constructed with complementary interlocking elements, said interlocking elements comprising a pair of parallel overhung ridges projecting vertically from the plane of the face of one of said members and spaced apart from each other by a distance greater than the width of said opening and two opposite recessed areas, thereby to be disposed one outward of each of said opposite recessed areas, each of said ridges extending for a distance substantially equal to the lineal dimension of said member, said ridges extending substantially from one edge toward an opposite edge of the last said one member, a third similarly projecting overhung ridge, said third ridge extending between the substantial terminals of said pair of ridges which terminals are remote from said one edge; said members being molded integrally of a plastic, such as polypropylene, and being joined to each other during molding along a common edge line, said line of juncture forming a hinge and coinciding with said one edge of the said ridged member, said members further being partially separable from each other by the disengagement of said interlocking elements, thereby to permit the swinging of said members in a preselected arc of movement about said hinge.

References Cited by the Examiner

UNITED STATES PATENTS

| | | | |
|---|---|---|---|
| 2,227,973 | 1/41 | Hood | 40—152 |
| 2,527,765 | 10/50 | Roehrl | 40—159 |
| 2,528,366 | 10/50 | Houston | 40—159 |
| 2,639,530 | 5/53 | Merrill | 40—152 |
| 2,697,889 | 12/54 | Heim | 40—152 |
| 2,825,989 | 3/58 | Kwolek | 40—152 |
| 2,959,882 | 11/60 | Krull | 40—152 |
| 2,968,884 | 1/61 | Anastasio et al. | 40—152 |

FOREIGN PATENTS

| | | |
|---|---|---|
| 1,163,657 | 4/58 | France. |
| 1,046,909 | 12/58 | Germany. |

EUGENE R. CAPOZIO, *Primary Examiner.*

EDWARD V. BENHAM, JEROME SCHNALL,
*Examiners.*